US008519576B2

(12) United States Patent
Maenosono

(10) Patent No.: US 8,519,576 B2
(45) Date of Patent: Aug. 27, 2013

(54) DRIVING DEVICE

(71) Applicant: Sueharu Maenosono, Moriyama (JP)

(72) Inventor: Sueharu Maenosono, Moriyama (JP)

(73) Assignee: Sueharu Maenosono, Moriyama-shi (JP)

( * ) Notice: Subject to any disclaimer, the term of this patent is extended or adjusted under 35 U.S.C. 154(b) by 0 days.

(21) Appl. No.: 13/656,741

(22) Filed: Oct. 22, 2012

(65) Prior Publication Data

US 2013/0099601 A1  Apr. 25, 2013

(30) Foreign Application Priority Data

Oct. 24, 2011  (JP) .................................. 2011-233048

(51) Int. Cl.
   *H02K 7/06* (2006.01)
(52) U.S. Cl.
   USPC ............................................. 310/20; 310/46
(58) Field of Classification Search
   USPC ..................................... 310/20, 15, 24, 37, 46
   See application file for complete search history.

(56) References Cited

U.S. PATENT DOCUMENTS

| | | | | | |
|---|---|---|---|---|---|
| 3,676,719 | A | * | 7/1972 | Pecci | 310/24 |
| 5,469,004 | A | * | 11/1995 | Jachim | 310/24 |
| 5,701,855 | A | | 12/1997 | Kurihara et al. | |
| 6,049,146 | A | | 4/2000 | Takara | |
| 8,324,762 | B2 | * | 12/2012 | Keller | 310/20 |
| 2008/0012432 | A1 | * | 1/2008 | Togare | 310/24 |
| 2008/0079320 | A1 | | 4/2008 | Beaulieu | |
| 2008/0122299 | A1 | * | 5/2008 | Cristoforo et al. | 310/20 |
| 2011/0001381 | A1 | * | 1/2011 | McDaniel | 310/152 |
| 2012/0299399 | A1 | * | 11/2012 | Baird | 310/20 |

FOREIGN PATENT DOCUMENTS

| | | |
|---|---|---|
| CN | 2447986 Y | 9/2001 |
| CN | 1457134 | 11/2003 |
| CN | 101441919 | 5/2009 |
| CN | 101185228 B | 1/2011 |
| JP | 2-060477 | 2/1990 |
| JP | 08-086208 | 4/1996 |
| JP | 10-115207 | 5/1998 |
| JP | 2008-228372 | 9/2008 |
| JP | 2011-043157 | 3/2011 |
| WO | WO 97/23728 | 7/1997 |

OTHER PUBLICATIONS

Decision to Grant Patent for corresponding JP Application No. 2011-233048, Dec. 6, 2011.
Chinese Office Action for corresponding CN Application No. 201210401531.2, Jun. 26, 2013.

* cited by examiner

*Primary Examiner* — Thanh Lam
(74) *Attorney, Agent, or Firm* — Ditthavong Mori & Steiner, P.C.

(57) ABSTRACT

A driving device includes an alternating magnetic field producing member, a piston member and a crankshaft member. The alternating magnetic field producing member is for producing an alternating magnetic field. The piston member is adapted such that an eddy current is produced therein by an alternating magnetic field produced by the alternating magnetic field producing member, and is movable by a repulsive force between a magnetic field produced by the eddy current and the alternating magnetic field. The crankshaft member is connected to the piston member and can convert the movement of the piston member into a rotational motion. The driving device that can obtain driving force in an environmentally friendly and efficient manner can thus be provided.

9 Claims, 11 Drawing Sheets

DRIVING DEVICE

BACKGROUND OF THE INVENTION

1. Field of the Invention

The present invention relates to a driving device, and more particularly relates to a driving device through use of an alternating magnetic field.

2. Description of the Background Art

A component that may produce thermal energy by combustion therein to obtain mechanical energy from the thermal energy is generally called an internal combustion engine.

Japanese Patent Laying-Open No. 10-115207 describes a structure of an internal combustion engine used for a lawn mower, for example. The internal combustion engine of Japanese Patent Laying-Open No. 10-115207 has a piston, a cylinder part, a connection rod, and a crankshaft. In this internal combustion engine, air, fuel and an oil mixture are burnt in a fuel chamber formed by the piston and a cylinder member. The piston thereby reciprocates, and its reciprocating movement is converted into a rotational motion of the crankshaft via the connection rod.

An internal combustion engine used for a vehicle or the like is described in Japanese Patent Laying-Open No. 8-86208, for example.

However, the internal combustion engines described in Japanese Patent Laying-Open Nos. 10-115207 and 8-86208 produce driving force by burning a fossil fuel, such as gasoline. Burning a fossil fuel causes carbon dioxide, nitrogen oxide and sulfur oxide to be discharged into the atmosphere. For example, carbon dioxide discharged into the atmosphere acts as a greenhouse effect gas by absorbing part of infrared light emitted from the ground, which is pointed out to be a cause of global warming. Nitrogen oxide and sulfur oxide discharged into the atmosphere are mixed into rain to turn into nitric acid and sulfuric acid, which are causes of acid rain. As described, the internal combustion engines that obtains driving force using a fossil fuel cause environmental problems, such as global warming and acid rain.

SUMMARY OF THE INVENTION

Therefore, the present invention has a main object to provide a driving device that can obtain driving force in an environmentally friendly and efficient manner.

The driving device according to the present invention includes an alternating magnetic field producing member, a piston member and a crankshaft member. The alternating magnetic field producing member is for generating an alternating magnetic field. The piston member is adapted such that an eddy current is produced therein by the alternating magnetic field produced by the alternating magnetic field producing member, and provided to be movable by a repulsive force between a magnetic field produced by the eddy current and the alternating magnetic field. The crankshaft member is connected to the piston member and provided to be capable of converting a movement of the piston member into a rotational motion.

With the driving device according to the present invention, driving force can be generated using an alternating magnetic field producing member instead of a fossil fuel. Therefore, driving force can be obtained without generating carbon dioxide leading to global warming and nitrogen oxide and sulfur oxide leading to acid rain, which is environmentally friendly.

In addition, in order to obtain driving force by the driving device according to the present invention, it is only necessary to rotate the alternating magnetic field producing member. Driving force can thus be taken out efficiently.

Further, since the structure other than the alternating magnetic field producing member closely resembles the structure of an existing internal combustion engine, components of the existing internal combustion engine can be utilized as they are.

Preferably, in the above-described driving device, the alternating magnetic field producing member includes a permanent magnet with N and S poles arranged alternately, and is adapted such that the N and S poles are changed in position relative to the piston member.

Since an alternating magnetic field can thereby be produced by the permanent magnet, less electric power is required than in the case of producing the alternating magnetic field by an electromagnet.

Preferably, in the above-described driving device, the alternating magnetic field producing member has a columnar shape. The N and S poles of the permanent magnet are arranged alternately in a circumferential direction on a surface of the columnar shape, and are provided to be rotatable around an axis of the columnar shape.

An alternating magnetic field is thereby produced in the circumferential direction of the columnar alternating magnetic field producing member.

Preferably, in the above-described driving device, the piston member includes a plurality of pistons arranged on an outer circumferential side of the alternating magnetic field producing member of the columnar shape along the circumferential direction of the alternating magnetic field producing member of the columnar shape.

By arranging the plurality of pistons in the circumferential direction of the columnar alternating magnetic field producing member, the alternating magnetic field produced in the circumferential direction is efficiently utilized to obtain driving force.

Preferably, in the above-described driving device, the piston member includes a plurality of pistons arranged on an outer circumferential side of the alternating magnetic field producing member of the columnar shape along a direction of the axis of the alternating magnetic field producing member of the columnar shape.

By arranging the plurality of pistons in the axial direction of the columnar alternating magnetic field producing member, the alternating magnetic field produced in the axial direction is efficiently utilized to obtain driving force.

Preferably, in the above-described driving device, a magnetic yoke member is provided between the alternating magnetic field producing member and the piston member.

Since the alternating magnetic field is efficiently collected by the magnetic yoke, driving force is obtained efficiently.

Preferably, the above-described driving device further includes a cylinder member for guiding the movement of the piston member. The cylinder member is made of an insulating material.

Since the cylinder member is made of the insulating material, no eddy current occurs. Therefore, the cylinder member is prevented from generating heat due to an eddy current. In addition, since an eddy current intensively occurs in the piston, a repulsive force between the alternating magnetic field and a magnetic field produced by the eddy current produced by the alternating magnetic field is efficiently transmitted to the piston member.

Preferably, the above-described driving device further includes a power generation unit for converting energy of the rotational motion of the crankshaft member into electrical energy.

Accordingly, electrical energy is obtained by using the alternating magnetic field instead of a fossil fuel.

Preferably, in the above-described driving device, at least part of electric power generated by the power generation unit is used for production of the alternating magnetic field.

Since electric power used for the alternating magnetic field producing member is thereby reduced, driving force is obtained efficiently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinbelow, embodiments of the present invention will be described based on the drawings.

First Embodiment

The structure of a driving device according to an embodiment of the present invention will be described first with reference to FIGS. 1A to 1C and 2.

Figure 1:
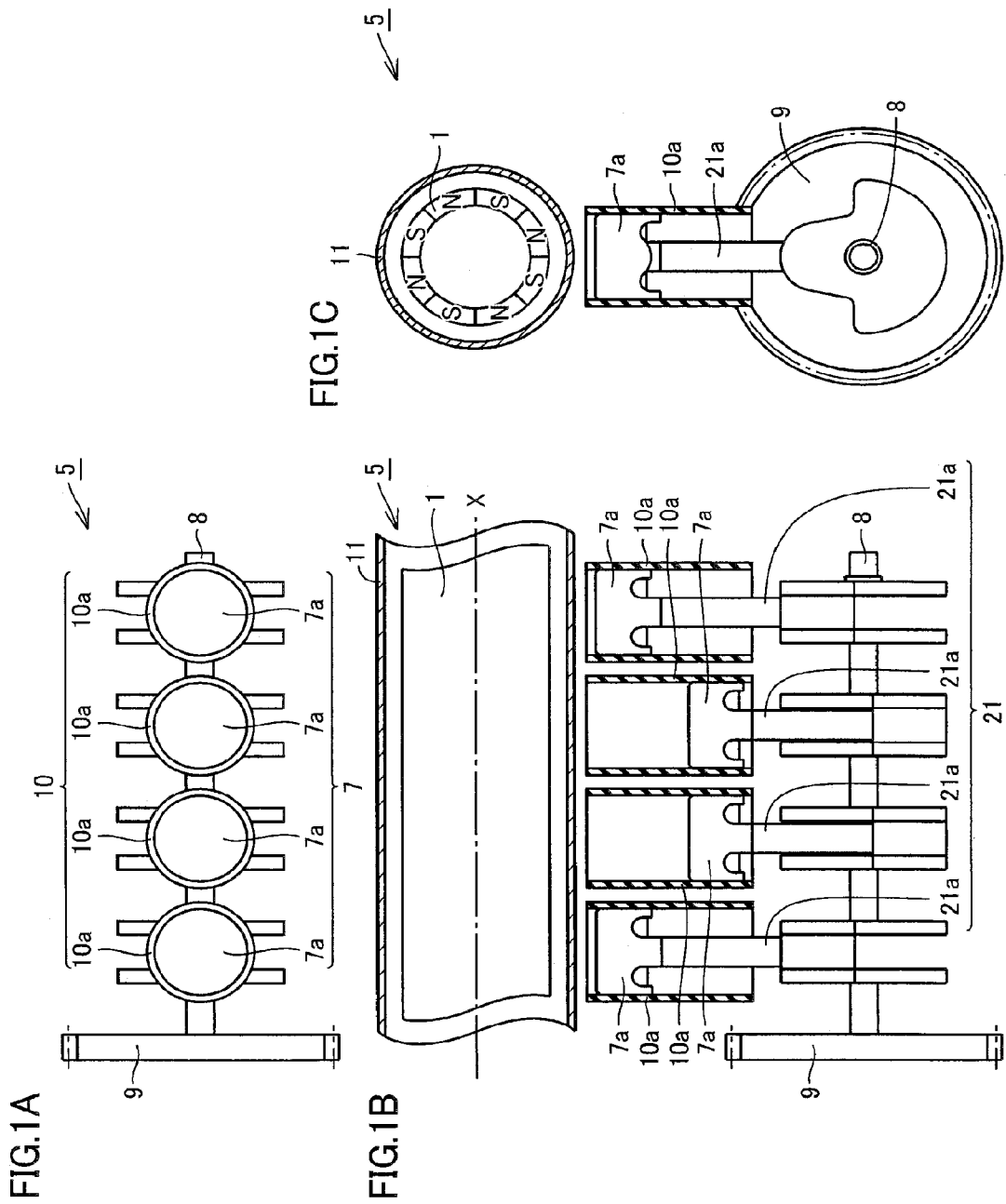
FIG. 1A is a schematic plan view of a driving device according to a first embodiment.
FIG. 1B is a partial sectional front view of the driving device according to the first embodiment.
FIG. 1C is a partial sectional side view of the driving device according to the first embodiment.

As shown in FIGS. 1A to 1C, a driving device 5 according to the present embodiment mainly has an alternating magnetic field producing member 1, a piston member 7, a connecting rod member 21, a cylinder member 10, a crankshaft member 8, a flywheel member 9, and a protection member 11.

Figure 2:
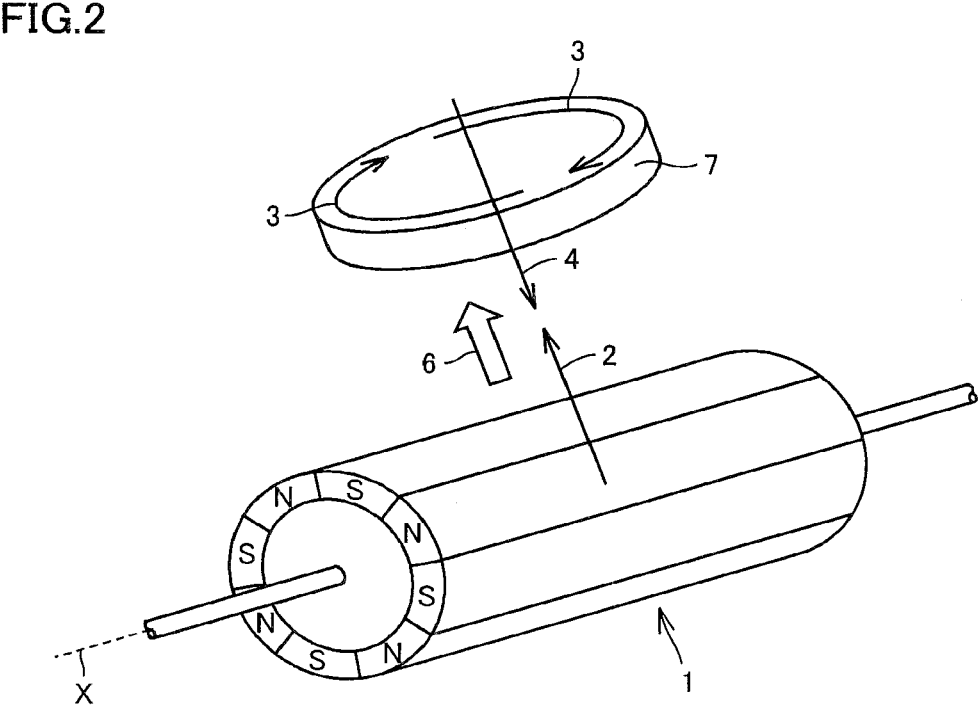
FIG. 2 is a schematic diagram illustrating a principle on which a repulsive force occurs between an alternating magnetic field and a magnetic field produced by an eddy current.
Figure 3:
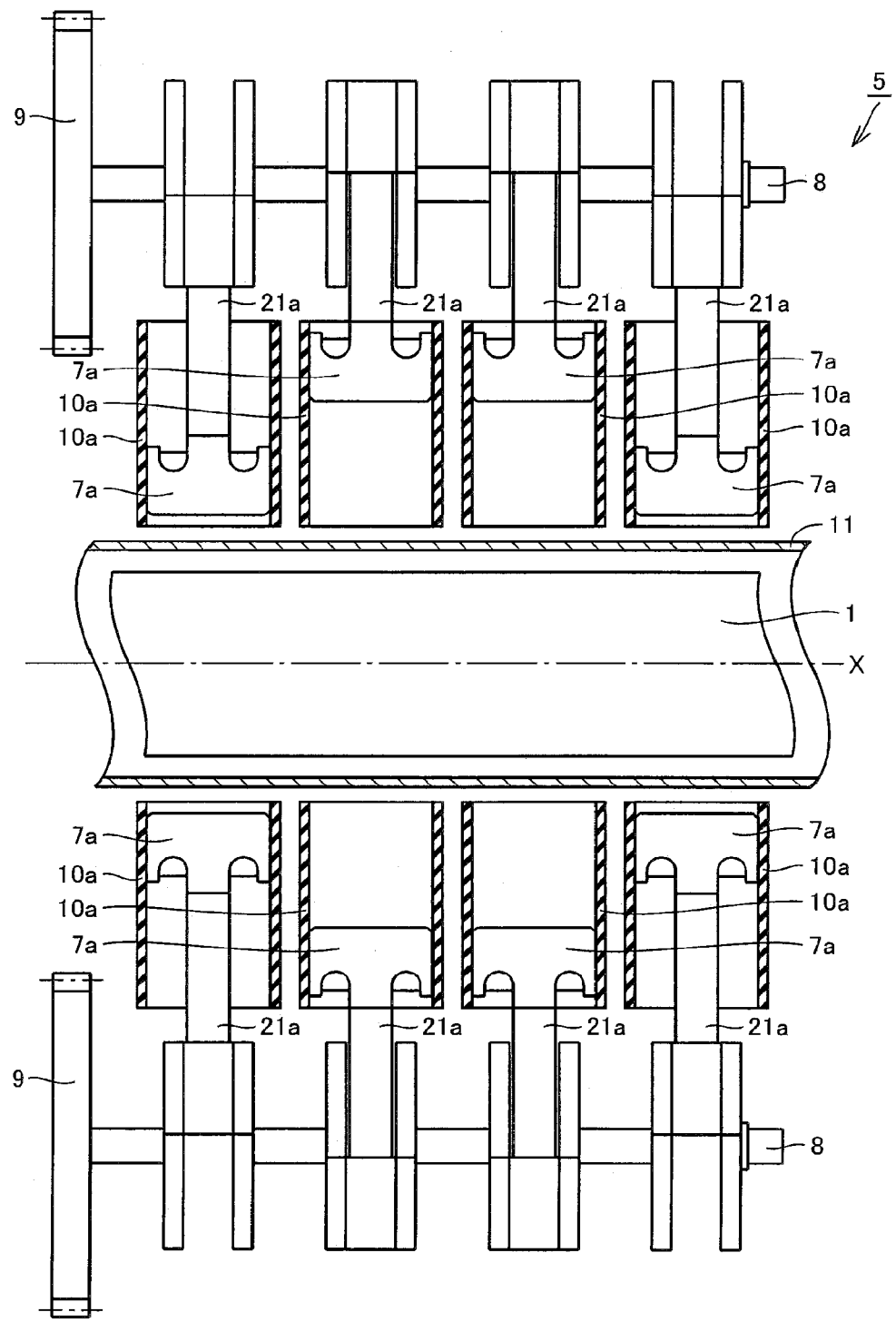
FIG. 3 is a partial sectional front view of a structure in which a plurality of pistons are arranged in the circumferential direction of an alternating magnetic field producing member in the driving device according to the first embodiment.
Figure 4:
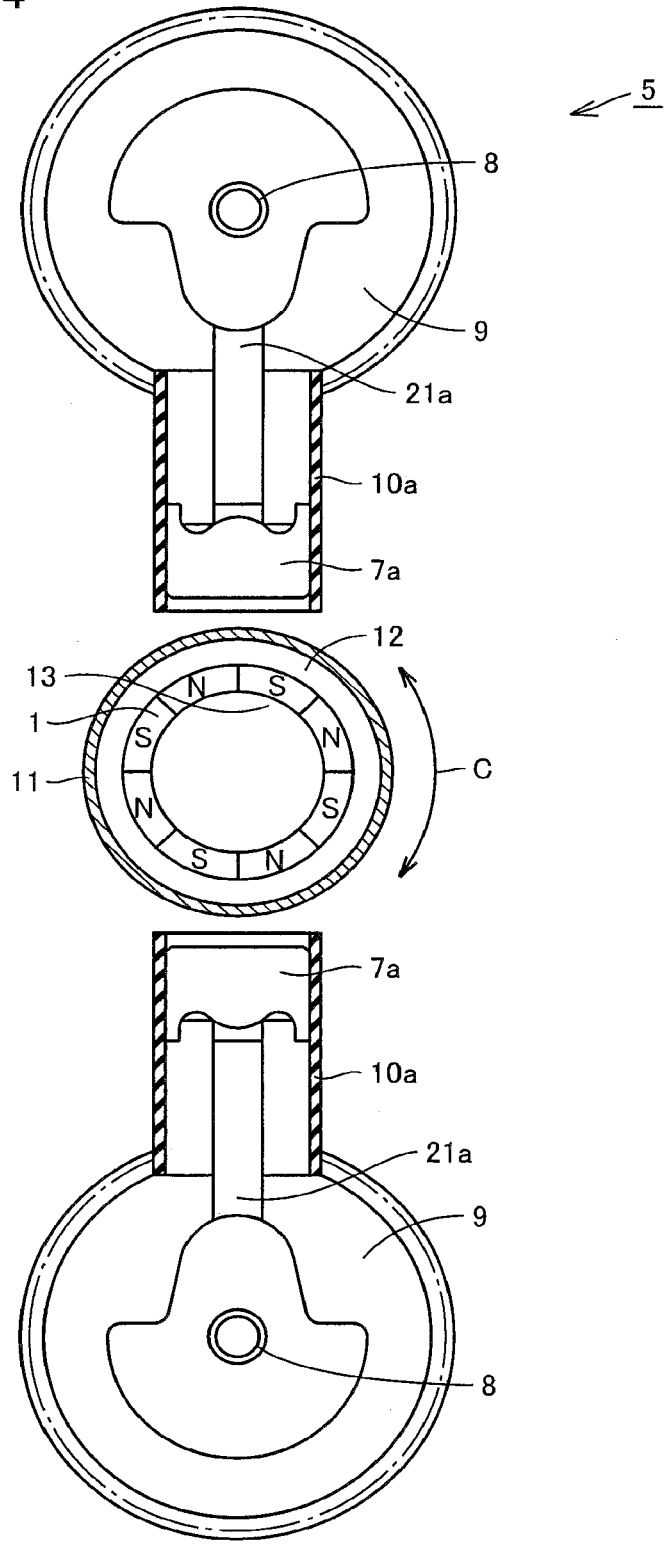
FIGS. 4 to 6 are partial sectional side views each showing a structure in which a plurality of pistons are arranged in the circumferential direction of the alternating magnetic field producing member in the driving device according to the first embodiment.

Alternating magnetic field producing member 1 has a cylindrical shape, for example, as shown in FIG. 2, and has a permanent magnet with N and S poles arranged alternately in the circumferential direction on the surface of a cylindrical rotor. The permanent magnet used for alternating magnetic field producing member 1 preferably has a composition of $RE_2Fe_{14}B$ (RE: rare earth element), for example. RE is preferably neodymium (Nd), for example. The permanent magnet with the N and S poles is fixed to the rotor with an adhesive, and the surface of the permanent magnet is protected by a fibrous thin tape. Alternating magnetic field producing member 1 is adapted to be rotatable around an axis X and such that the N and S poles are thereby changed in position relative to piston member 7.

To rotate alternating magnetic field producing member 1 around axis X, a motor or the like is used, for example. For example, a support rod extending in the direction of axis X of alternating magnetic field producing member 1 is connected to a rotor part of the motor, and the motor is supplied with electric power from the outside to rotate the rotor of the motor, so that alternating magnetic field producing member 1 can be rotated.

Piston member 7 is adapted such that an eddy current 3 is produced therein by an alternating magnetic field 2 produced by alternating magnetic field producing member 1. Specifically, by using a conductive metal of high conductivity and low resistivity (electric resistivity) as the material of piston member 7, piston member 7 is adapted such that eddy current 3 flows therein. For example, silver (Ag), copper (Cu), gold (Au), aluminum (Al), magnesium (Mg), tungsten (W), or the like is used alone or in any combination is adopted as the material of conductive metal used for piston member 7. Table 1 shows conductivity and resistivity of each metal.

TABLE 1

| Name of metal | Conductivity (s/m) | Resistivity (ωm) |
| --- | --- | --- |
| silver | 62.8 | $1.59 \times 10^{-8}$ |
| copper | 59.5 | $1.68 \times 10^{-8}$ |
| gold | 45.2 | $2.21 \times 10^{-8}$ |
| aluminum | 37.7 | $2.65 \times 10^{-8}$ |
| magnesium | 22.6 | $4.42 \times 10^{-8}$ |
| tungsten | 18.9 | $5.29 \times 10^{-8}$ |

Piston member 7 is provided to be movable by a repulsive force between a magnetic field 4 produced by eddy current 3 mentioned above and alternating magnetic field 2 of alternating magnetic field producing member 1. Specifically, by connecting piston member 7 to crankshaft member 8 with connecting rod member 21 interposed therebetween, piston member 7 is movable in the vertical direction relative to crankshaft member 8.

Connection with piston member 7 as described above allows crankshaft member 8 to convert the movement of piston member 7 into a rotational motion. Specifically, crankshaft member 8 has a crank pin which is an eccentric part, to which piston member 7 is connected with connecting rod member 21 interposed therebetween, and can thereby convert the movement of piston member 7 into a rotational motion.

Cylinder member 10 is for guiding the movement of piston member 7. Cylinder member 10 is provided to surround the side surface of piston member 7, for example. Cylinder member 10 has a cylindrical shape, for example. As the material of cylinder member 10, it is preferable to use an insulating material, which is a different material from that of piston member 7. Hard resin, such as Delrin (registered trademark), Duracon (registered trademark), PEEK (registered trademark), or Teflon (registered trademark), for example, is used as the material of cylinder member 10.

Flywheel member 9 is connected to crankshaft member 8 and provided such that the rotational motion of crankshaft member 8 becomes smooth.

Protection member 11 is provided to surround alternating magnetic field producing member 1 so as to protect alternating magnetic field producing member 1. This protection member 11 preferably has high magnetic permeability, such as permalloy. It is noted that protection member 11 may be omitted.

It is noted that alternating magnetic field producing member 1 is not limited to a permanent magnet, but may be an electromagnet. An alternating magnetic field can be produced by passing an alternating current through a solenoid coil, for example. Although alternating magnetic field producing member 1 has a cylindrical shape in the above description, alternating magnetic field producing member 1 should only be columnar, and may be in the form of polygonal column, for example. Axis X in the above description refers to an axis of rotation around which columnar alternating magnetic field producing member 1 is rotated. When alternating magnetic field producing member 1 has a cylindrical shape, for example, this axis X is a straight line passing through the center of circle in cross section of the cylinder and extending along the cylinder.

In addition, alternating magnetic field producing member 1 does not need to be columnar, but should only be adapted such that the N and S poles are changed in position relative to piston member 7.

Figure 10:
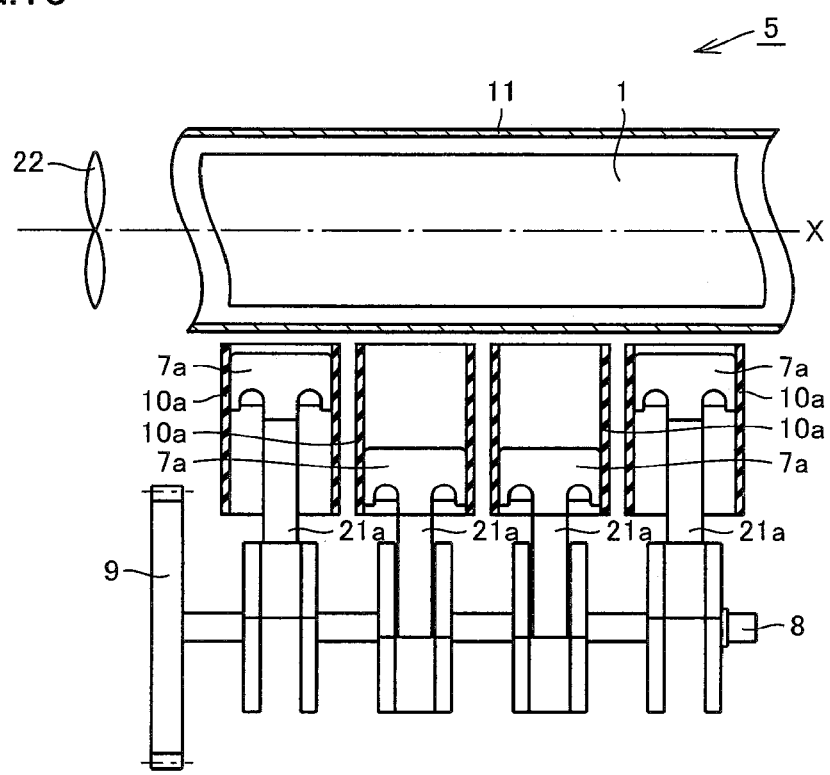
FIG. 10 is a schematic diagram of a structure in which a turbine is connected to the alternating magnetic field producing member in the driving device according to the first embodiment.

As another method for rotating alternating magnetic field producing member 1, a turbine 22 may be connected to the leading end of a support rod extending in the direction of axis X of alternating magnetic field producing member 1 as shown in FIG. 10, for example. In this structure, turbine 22 is rotated by fluid (gas, liquid, supercritical fluid) such as vapor, so that alternating magnetic field producing member 1 can be rotated. Specifically, turbine 22 as used for wind power generation, hydraulic power generation, thermal power generation, or the like can be used.

As shown in FIGS. 1A and 1B, piston member 7 preferably has a plurality of pistons 7a arranged in the direction of axis X of columnar alternating magnetic field producing member 1. In the present embodiment, four pistons 7a are arranged in the direction of axis X of alternating magnetic field producing member 1. Cylinder member 10 for guiding the movement of above-described four pistons 7a also has four cylinders 10a for guiding the movement of pistons 7a, respectively. Further, connecting rod member 21 for transmitting the vertical movement of above-described four pistons 7a to crankshaft member 8 also has four connecting rods 21a for connection with pistons 7a, respectively.

It is noted that, although the present embodiment has described by way of example the case in which the number of pistons 7a is four, the present invention is not limited to such a structure. More than four pistons 7a may be provided, and it may be six or eight, for example. By providing pistons 7a in multiple stages, driving force can be increased.

The operation of the driving device of the present embodiment will now be described with reference to FIGS. 1A, 1B and 2.

Referring to FIGS. 1A, 1B and 2, first, cylindrical alternating magnetic field producing member 1 with the N and S poles of a permanent magnet arranged alternately in the circumferential direction is rotated around axis X. Then, at a certain position on the outer circumferential side of alternating magnetic field producing member 1, alternating magnetic field 2 in which the N and S poles are changed alternately is produced. When piston member 7 made of conductive metal is arranged at that position, eddy current 3 is produced in the surface of piston member 7. Eddy current 3 is produced to flow through piston member 7 so as to counteract alternating magnetic field 2 produced by alternating magnetic field producing member 1. Therefore, magnetic field 4 produced by eddy current 3 repels alternating magnetic field 2 produced by alternating magnetic field producing member 1. Piston member 7 is moved by this repulsive force 6.

Piston member 7 is connected to connecting rod member 21. Connecting rod member 21 is connected to the crank pin which is an eccentric part of crankshaft member 8. Piston member 7 is moved in the vertical direction over the wall surface of cylinder member 10 by the above-described repulsive force 6. The vertical movement of piston member 7 drives crankshaft member 8 via connecting rod member 21. As described above, the linear movement of piston member 7 in the vertical direction is converted into a rotational motion via connecting rod member 21 and crankshaft member 8. This rotational motion is utilized for rotation of a driving wheel of vehicle, for example.

Driving device 5 in the present embodiment refers to a device that drives a wheel of vehicle or motorcycle, for example. Alternatively, driving device 5 according to the present invention may be driving device 5 or the like that rotates a train wheel, an aircraft propeller, a marine screw, or the like, for example.

The effects of driving device 5 of the present embodiment will now be described.

Driving force can be obtained from driving device 5 of the present embodiment by alternating magnetic field 2, without using a fossil fuel, such as gasoline. Therefore, carbon dioxide leading to global warming and nitrogen oxide and sulfur oxide leading to acid rain are not produced, which means driving device 5 of the present embodiment is environmentally friendly.

To obtain driving force by driving device 5 of the present embodiment, it is only necessary to rotate alternating magnetic field producing member 1. Driving force can thus be taken out efficiently.

Further, since the structure other than alternating magnetic field producing member 1 closely resembles the structure of an existing internal combustion engine, components of the existing internal combustion engine can be utilized as they are.

Alternating magnetic field producing member 1 of driving device 5 of the present embodiment includes the permanent magnet with the N and S poles arranged alternately, and is adapted such that the N and S poles are changed in position relative to piston member 7. Since alternating magnetic field 2 can thereby be produced by the permanent magnet, less electric power is required than in the case of producing a similar alternating magnetic field 2 by an electromagnet.

Alternating magnetic field producing member 1 of driving device 5 of the present embodiment has a cylindrical shape. The N and S poles of the permanent magnet are arranged alternately along circumferential direction C on the surface of cylindrical shape, and are provided to be rotatable around axis X of cylindrical shape. Alternating magnetic field 2 can thereby be produced in circumferential direction C of cylindrical alternating magnetic field producing member 1.

As shown in FIGS. 1A and 1B, piston member 7 of driving device 5 of the present embodiment includes plurality of pistons 7a arranged along the direction of axis X of cylindrical alternating magnetic field producing member 1. These plurality of pistons 7a are connected to one crankshaft member 8. By arranging plurality of pistons 7a in the direction of axis X of cylindrical alternating magnetic field producing member 1, alternating magnetic field 2 produced in the direction of axis X can be efficiently utilized to obtain driving force.

Driving device 5 of the present embodiment further has cylinder member 10 for guiding the movement of piston member 7, and cylinder member 10 is made of an insulating material. As described above, eddy current 3 does not occur in cylinder member 10 since cylinder member 10 is made of an insulating material. Cylinder member 10 is therefore prevented from generating heat due to eddy current 3. Since eddy current 3 intensively occurs in piston member 7, repulsive force 6 between alternating magnetic field 2 and magnetic field 4 produced by eddy current 3 produced by alternating magnetic field 2 is efficiently transmitted to piston member 7.

Driving device 5 of the present embodiment further has flywheel member 9 connected to crankshaft member 8. This flywheel member 9 allows the reciprocating movement of piston member 7 to be efficiently converted into a rotational motion.

Figure 5:
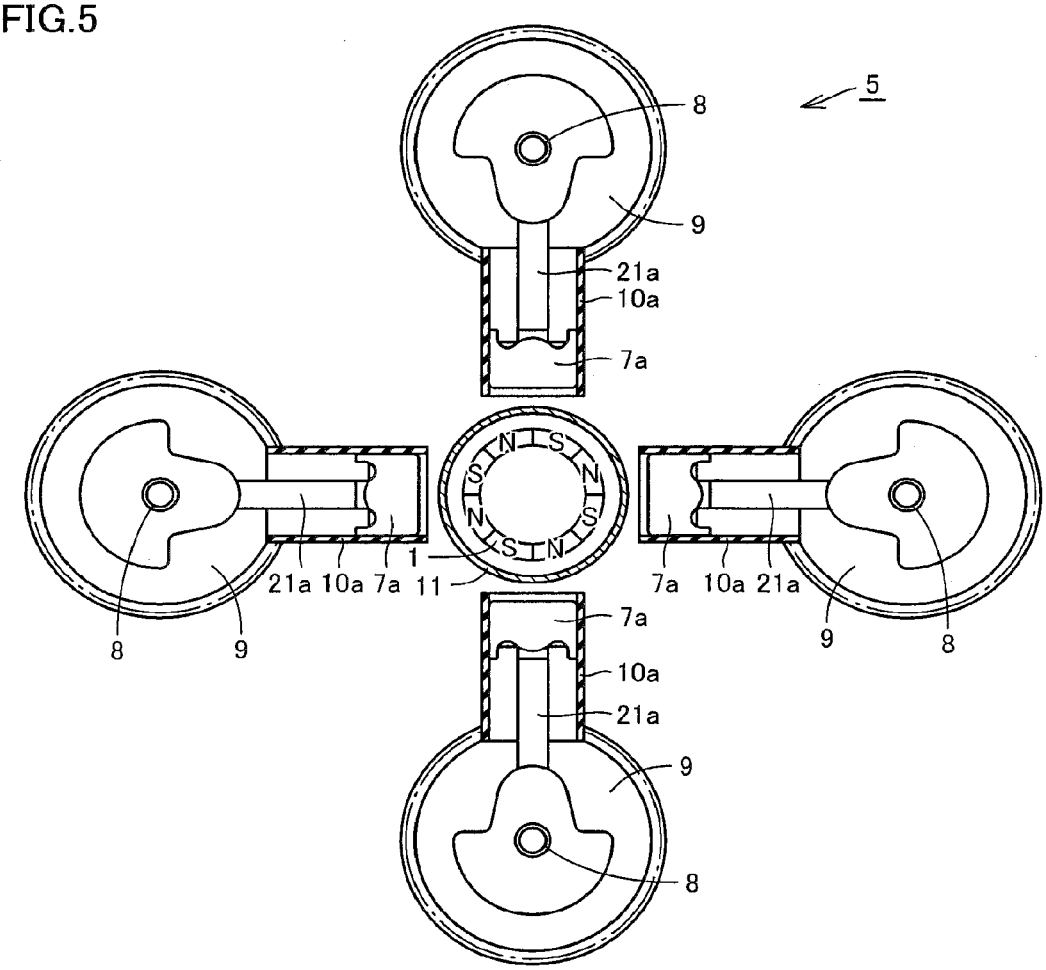
Figure 6:
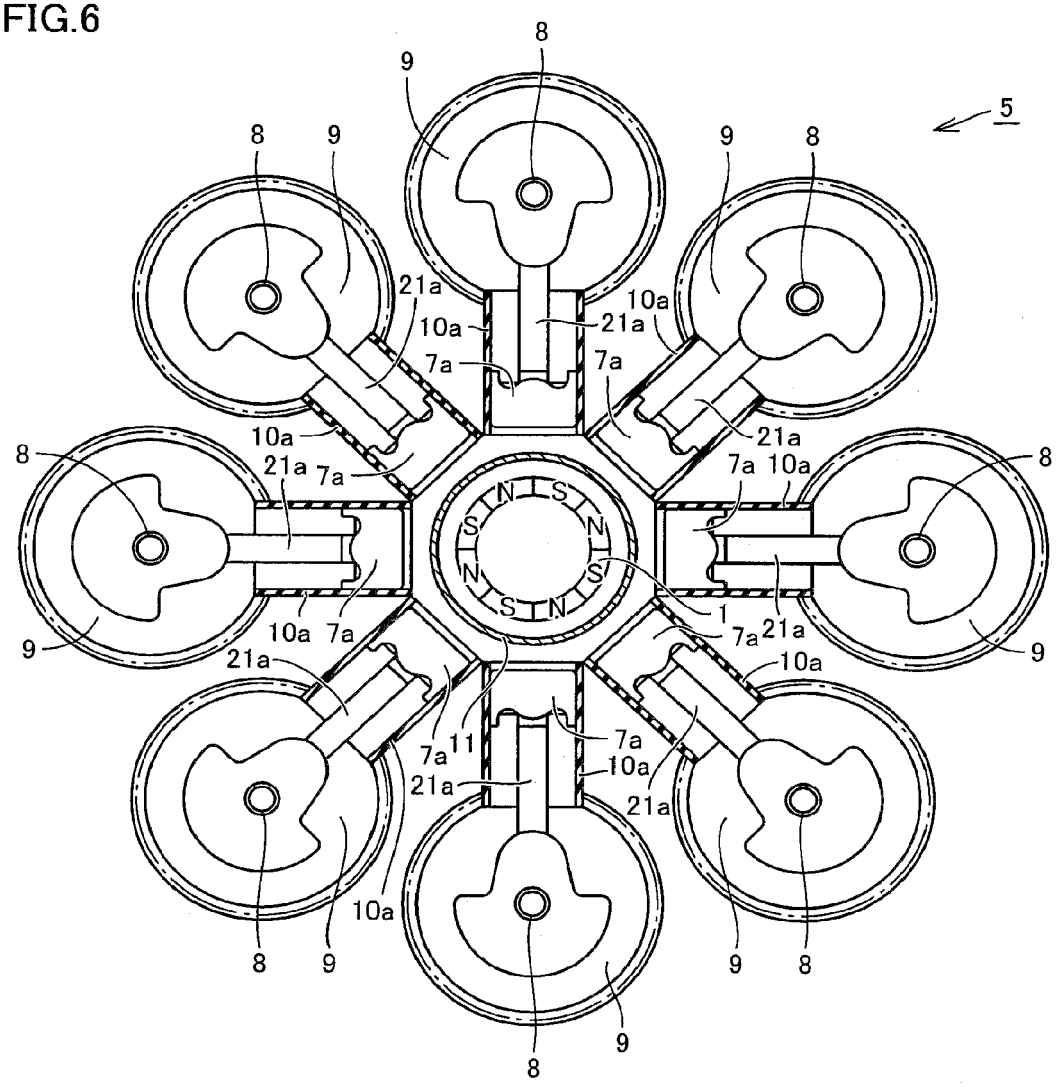

As shown in FIGS. 3 to 6, piston member 7 preferably has plurality of pistons 7a arranged in circumferential direction C of columnar alternating magnetic field producing member 1. Driving device 5 shown in FIGS. 3 and 4 has two pistons 7a arranged opposite to each other on an outer circumferential side 12 of cylindrical alternating magnetic field producing member 1. Each piston 7a has four pistons 7a, for example, in the direction of axis X of cylindrical alternating magnetic field producing member 1. As shown in FIG. 5, four pistons 7a may be arranged away from one another by 90 degrees in the circumferential direction of cylindrical alternating magnetic field producing member 1. Alternatively, as shown in FIG. 6, eight pistons 7a may be arranged away from one another by 45 degrees in circumferential direction C of cylindrical alternating magnetic field producing member 1.

By arranging plurality of pistons 7a in circumferential direction C of cylindrical alternating magnetic field producing member 1 as described above, driving force is obtained from one alternating magnetic field producing member 1 efficiently utilizing alternating magnetic field 2 produced in circumferential direction C. It is noted that plurality of pistons 7a may be arranged in the direction of axis X of alternating magnetic field producing member 1, and another plurality of pistons 7a may be arranged in circumferential direction C of alternating magnetic field producing member 1.

Figure 7:
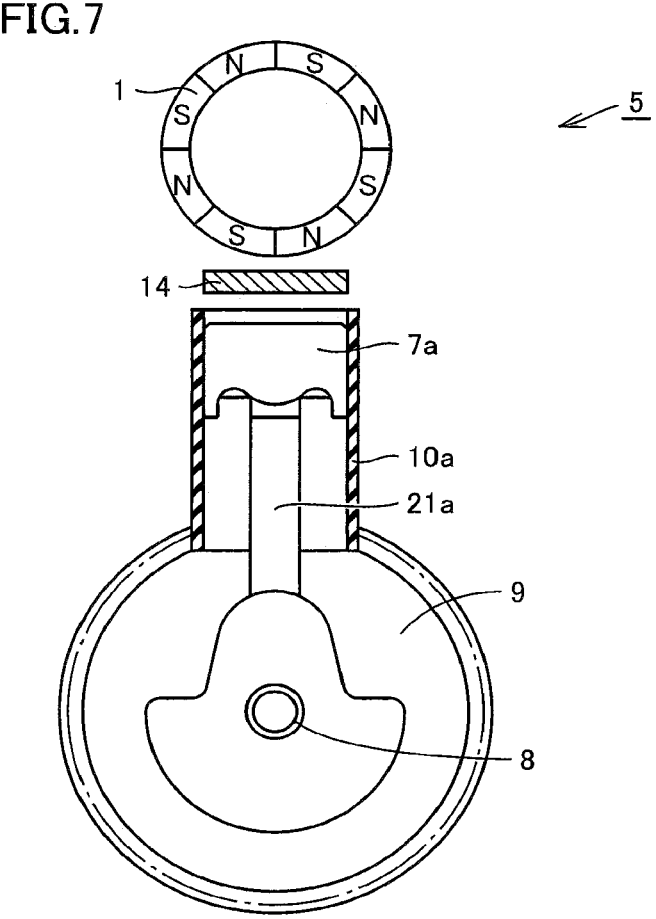
FIG. 7 is a partial sectional side view of a structure in which a magnetic yoke member is arranged between the alternating magnetic field producing member and a piston in the driving device according to the first embodiment.

As shown in FIG. 7, driving device 5 may have a magnetic yoke member 14 between alternating magnetic field producing member 1 and piston member 7. Magnetic yoke member 14 is made of a material having high magnetic permeability, such as permalloy, for example. By providing magnetic yoke member 14 between alternating magnetic field producing member 1 and piston member 7, alternating magnetic field 2 is efficiently collected by magnetic yoke member 14, so that driving force is obtained efficiently.

Figure 11:
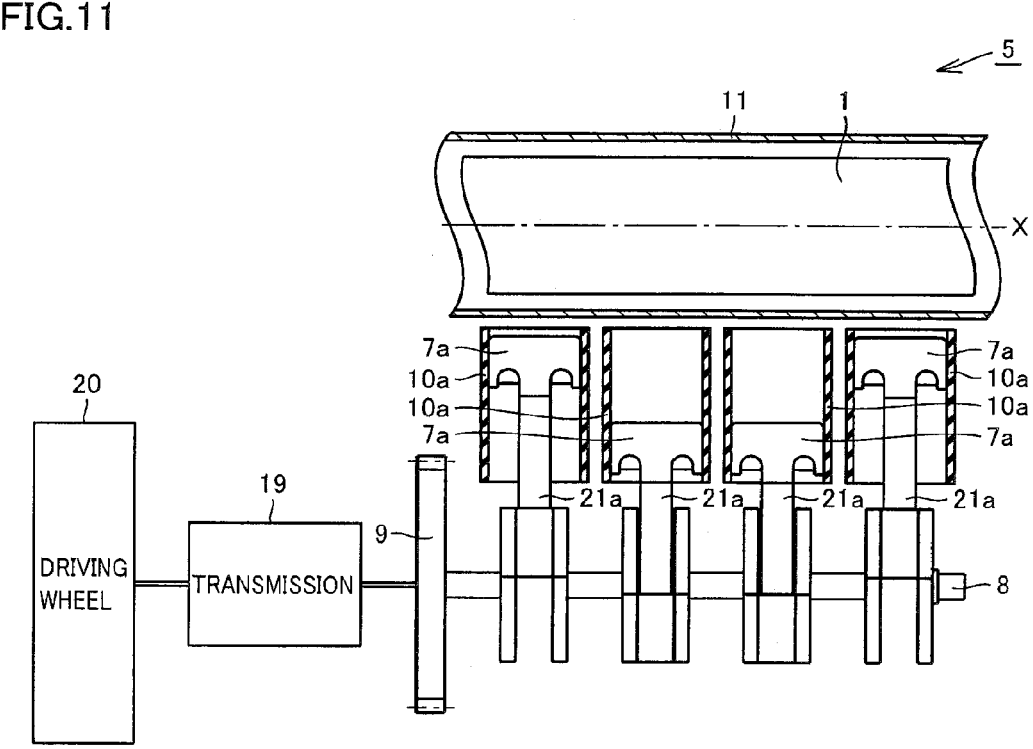
FIG. 11 is a schematic diagram of a structure in which a driving wheel is attached to a crankshaft member in the driving device according to the first embodiment with a transmission interposed therebetween.

As shown in FIG. 11, driving device 5 may have a transmission 19 connected to crankshaft member 8, and a driving wheel 20.

Transmission 19 is provided to be capable of converting the rotation of crankshaft member 8 into desired speed, desired torque, or the like. Driving wheel 20 is connected to transmission 19, and is provided to be rotatable by the rotation of crankshaft member 8. Driving wheel 20 refers to a wheel of vehicle, for example.

Second Embodiment

The structure of a driving device according to a second embodiment of the present invention will now be described with reference to FIGS. 8 and 9.

Figure 8:
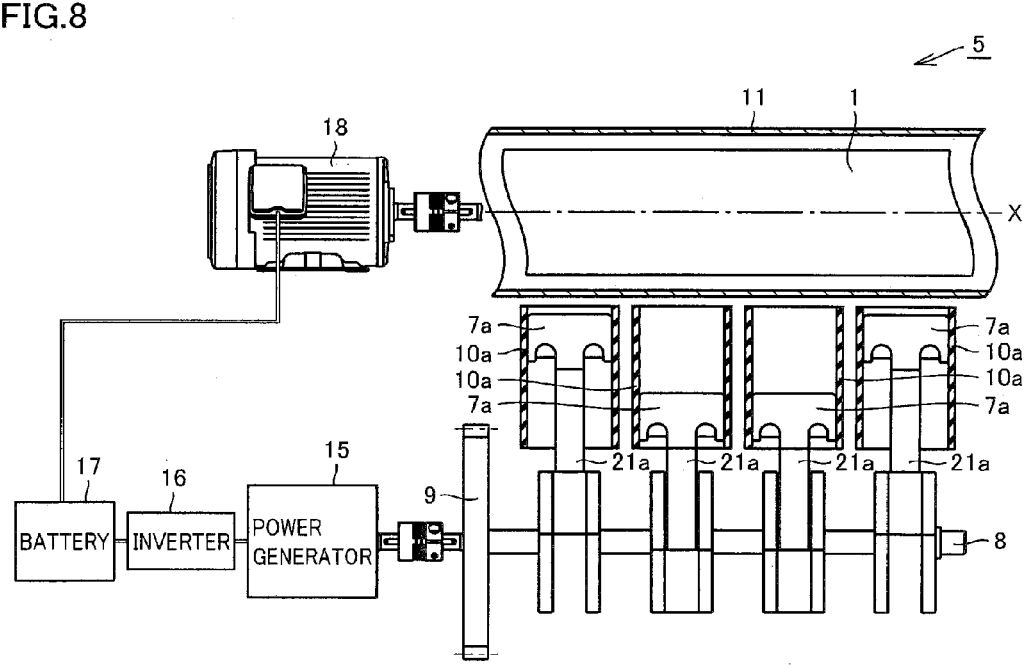
FIG. 8 is a schematic diagram of a driving device according to a second embodiment.
Figure 9:
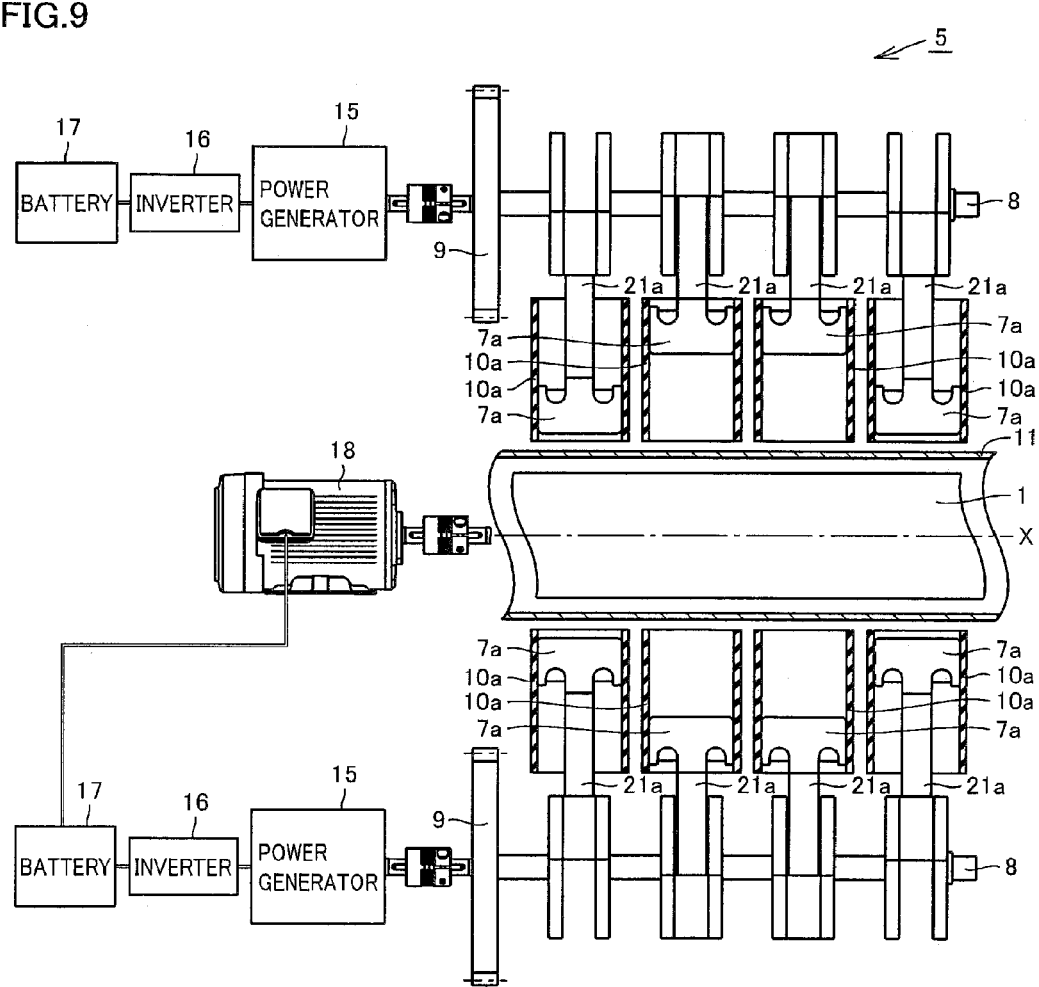
FIG. 9 is a schematic diagram of a structure in which a plurality of pistons are arranged in the circumferential direction of an alternating magnetic field producing member in the driving device according to the second embodiment.

As shown in FIGS. 8 and 9, the structure of driving device 5 according to the present embodiment differs from the structure of the first embodiment shown in FIGS. 1A and 1B in that a power generator 15, an inverter 16, a battery 17, and a motor 18 are added.

Power generator 15 is connected to crankshaft member 8, and can convert energy of rotational motion of crankshaft member 8 into electrical energy. Inverter 16 is connected to power generator 15, and can convert AC electric power generated by power generator 15 into DC electric power. Battery 17 is connected to inverter 16, and can store DC electric power obtained by converting AC electric power generated by power generator 15 into DC electric power by inverter 16. Battery 17 is provided to be capable of returning part of electric power stored in battery 17 to motor 18.

It is noted that, since the remaining structure of the present embodiment is substantially the same as that of the first embodiment described above, the same elements have the same reference characters allotted, and detailed description thereof will not be repeated.

The effects of driving device 5 of the second embodiment will now be described.

Driving device 5 of the second embodiment has power generator 15. Therefore, electrical energy is obtained by using alternating magnetic field 2. Since driving device 5 also has battery 17, electric power generated by power generator 15 can be stored in battery 17. Further, part of electric power stored in battery 17 is returned to motor 18. Therefore, electric power used for rotation of alternating magnetic field producing member 1 can be reduced.

When a plurality of crankshaft members 8 are arranged in the circumferential direction of alternating magnetic field producing member 1 as shown in FIG. 9, power generator 15, inverter 16 and battery 17 may be provided for each crankshaft member 8. Then, it may be adapted such that part of electric power stored in at least one battery 17 among a plurality of batteries 17 is returned to the motor.

Furthermore, in the structure shown in FIG. 10, electric power can also be obtained from rotation of turbine 22 by connecting power generator 15 to crankshaft member 8.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A driving device comprising:
   an alternating magnetic field producing member for generating an alternating magnetic field;
   a piston member adapted such that an eddy current is produced therein by the alternating magnetic field produced by said alternating magnetic field producing member, and provided to be movable by a repulsive force between a magnetic field produced by said eddy current and said alternating magnetic field; and
   a crankshaft member connected to said piston member and provided to be capable of converting a movement of said piston member into a rotational motion.

2. The driving device according to claim 1, wherein said alternating magnetic field producing member includes a permanent magnet with N and S poles arranged alternately, and is adapted such that said N and S poles are changed in position relative to said piston member.

3. The driving device according to claim 2, wherein
said alternating magnetic field producing member has a columnar shape, and
said N and S poles of said permanent magnet are arranged alternately in a circumferential direction on a surface of said columnar shape, and are provided to be rotatable around an axis of said columnar shape.

4. The driving device according to claim 3, wherein said piston member includes a plurality of pistons arranged on an outer circumferential side of said alternating magnetic field producing member of said columnar shape along the circumferential direction of said alternating magnetic field producing member of said columnar shape.

5. The driving device according to claim 3, wherein said piston member includes a plurality of pistons arranged on an outer circumferential side of said alternating magnetic field producing member of said columnar shape along a direction of said axis of said alternating magnetic field producing member of said columnar shape.

6. The driving device according to claim 1, wherein a magnetic yoke member is provided between said alternating magnetic field producing member and said piston member.

7. The driving device according to claim 1, further comprising a cylinder member for guiding said movement of said piston member, wherein
said cylinder member is made of an insulating material.

8. The driving device according to claim 1, further comprising a power generation unit for converting energy of said rotational motion of said crankshaft member into electrical energy.

9. The driving device according to claim 8, wherein at least part of electric power generated by said power generation unit is used for production of said alternating magnetic field.

* * * * *